United States Patent
Topliss et al.

(10) Patent No.: US 11,262,580 B1
(45) Date of Patent: Mar. 1, 2022

(54) VIRTUAL REALITY SYSTEM

(71) Applicant: Apple Inc., Cupertino, CA (US)

(72) Inventors: Richard J. Topliss, Campbell, CA (US); Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 15/357,938

(22) Filed: Nov. 21, 2016

Related U.S. Application Data

(60) Provisional application No. 62/278,397, filed on Jan. 13, 2016.

(51) Int. Cl.
| | | |
|---|---|---|
| *G02B 27/00* | (2006.01) | |
| *G02B 27/01* | (2006.01) | |
| *G06F 3/01* | (2006.01) | |
| *H04N 13/324* | (2018.01) | |
| *H04N 13/344* | (2018.01) | |
| *H04N 13/383* | (2018.01) | |
| *H04N 13/398* | (2018.01) | |

(52) U.S. Cl.
CPC ..... *G02B 27/0093* (2013.01); *G02B 27/0172* (2013.01); *G02B 2027/0123* (2013.01);
(Continued)

(58) Field of Classification Search
CPC .............. G02B 26/0833; G02B 27/00; G02B 27/0075; G02B 27/0087; G02B 27/0093; G02B 27/01; G02B 27/0101; G02B 27/017; G02B 27/0172; G02B 27/0176; G02B 27/22; G02B 2027/0123; G02B 2027/0125; G02B 2027/0134; G02B 2027/014;
(Continued)

(56) References Cited

U.S. PATENT DOCUMENTS

| 6,084,697 A | 7/2000 | Lebby et al. |
| 9,077,973 B2 | 7/2015 | Aguren |

(Continued)

FOREIGN PATENT DOCUMENTS

WO 2016105282 6/2016

OTHER PUBLICATIONS

U.S. Appl. No. 15/413,310, filed Jan. 23, 2017, Richard J. Topliss.
(Continued)

*Primary Examiner* — Joseph P Martinez
*Assistant Examiner* — Vipin Patel
(74) *Attorney, Agent, or Firm* — Robert C. Kowert; Kowert, Hood, Munyon, Rankin & Goetzel, P.C.

(57) ABSTRACT

Methods and systems for a virtual and/or augmented reality device may include a light emitting device that includes one or more light emitting elements configured to generate collimated light beams. A scanning mirror may include one or more microelectromechanical systems (MEMS) mirrors. Each MEMS mirror of the scanning mirror may be configured to dynamically tilt in at least one of two orthogonal degrees of freedom to raster scan the light beams over multiple angles corresponding to a field of view of an image. A curved mirror may include curves in two orthogonal directions configured to reflect the collimated light beams from the scanning mirror into a subject's eye in proximity to the curved mirror to form a virtual image. The curved mirror may allow external light to pass through, thus allowing the virtual image to be combined with a real image to provide an augmented reality.

20 Claims, 12 Drawing Sheets

(52) U.S. Cl.
CPC ...... *G02B 2027/0178* (2013.01); *G06F 3/013* (2013.01); *H04N 13/324* (2018.05); *H04N 13/344* (2018.05); *H04N 13/383* (2018.05); *H04N 13/398* (2018.05); *H04N 2213/002* (2013.01)

(58) Field of Classification Search
CPC ........... G02B 2027/0178; G02F 1/0105; G02F 2001/294; G06F 3/01; G06F 3/011; G06F 3/013; G06T 15/00; G06T 19/006; H04N 13/00; H04N 13/117; H04N 13/30; H04N 13/324; H04N 13/332; H04N 13/344; H04N 13/366; H04N 13/383; H04N 13/398; H04N 2213/002
USPC .............. 359/631, 633, 8; 348/169; 362/553
See application file for complete search history.

(56) References Cited

U.S. PATENT DOCUMENTS

| | | | |
|---|---|---|---|
| 9,229,227 B2 | 1/2016 | Border et al. | |
| 9,297,945 B2 | 3/2016 | Ide et al. | |
| 9,529,191 B2 | 12/2016 | Sverdrup et al. | |
| 2008/0018641 A1 | 1/2008 | Sprague et al. | |
| 2010/0149073 A1 | 6/2010 | Chaum et al. | |
| 2012/0281293 A1 | 11/2012 | Gronenbom et al. | |
| 2013/0335302 A1 | 12/2013 | Crane et al. | |
| 2015/0235463 A1 | 8/2015 | Schowengerdt | |
| 2015/0241614 A1 | 8/2015 | Ide et al. | |
| 2015/0248158 A1 | 9/2015 | Schowengerdt | |
| 2015/0277121 A1 | 10/2015 | Fridental | |
| 2015/0277123 A1 | 10/2015 | Chaum et al. | |
| 2016/0089024 A1 | 3/2016 | Katashiba | |
| 2016/0150201 A1 | 5/2016 | Kilcher et al. | |
| 2017/0068091 A1 | 3/2017 | Greenberg | |
| 2017/0202457 A1 | 7/2017 | Swan et al. | |
| 2017/0285343 A1* | 10/2017 | Belenkii | G02B 27/0172 |
| 2017/0299870 A1 | 10/2017 | Urey et al. | |
| 2018/0203234 A1* | 7/2018 | Fiess | G02B 27/017 |
| 2018/0246336 A1 | 8/2018 | Greenberg | |

OTHER PUBLICATIONS

U.S. Appl. No. 15/405,226, filed Jan. 12, 2017, Alexander Shpunt.

* cited by examiner

VIRTUAL REALITY SYSTEM

PRIORITY INFORMATION

This application claims benefit of priority of U.S. Provisional Application Ser. No. 62/278,397 entitled "DISPLAY SYSTEM" filed Jan. 13, 2016, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling drones or other mechanical systems, viewing digital media content, interacting with the internet, or the like.

However, conventional virtual reality and augmented reality systems may suffer from accommodation-convergence mismatch problems that cause eyestrain, headaches, and/or nausea. Accommodation-convergence mismatch arises when a VR or AR system effectively confuses the brain of a user by generating scene content that does not match the depth expected by the brain based on the stereo convergence of the two eyes of the user. For example, in a stereoscopic system the images displayed to the user may trick the eye(s) into focusing at a far distance while an image is physically being displayed at a closer distance. In other words, the eyes may be attempting to focus on a different image plane or focal depth compared to the focal depth of the projected image, thereby leading to eyestrain and/or increasing mental stress. Accommodation-convergence mismatch problems are undesirable and may distract users or otherwise detract from their enjoyment and endurance levels (i.e. tolerance) of virtual reality or augmented reality environments.

SUMMARY

Methods and systems for a virtual reality (VR) and/or augmented reality (AR) device (e.g., a headset device) may include a light emitting device that may include one or more light emitting elements (e.g., lasers, LEDs, etc.) configured to generate one or more collimated light beams. A processor connected to the light emitting device may be configured to selectively activate one or more groups of the light emitting elements. A scanning mirror may include one or more microelectromechanical systems (MEMS) mirrors. Each MEMS mirror of the scanning mirror may be configured to dynamically tilt in at least one of two orthogonal degrees of freedom in response to instructions received from the processor. Each MEMS mirror may also be configured to raster scan the light beams over multiple angles corresponding to a field of view of an image. A curved mirror may include curves in two orthogonal directions configured to reflect the collimated light beams from the scanning mirror into a subject's eye in proximity to the curved mirror.

In some embodiments, a VR/AR system may include light emitting devices that each include one or more light emitting elements, for example lasers (e.g., vertical cavity surface-emitting lasers (VCSELs)), and respective focusing and/or collimation elements (e.g., dynamically adjustable focusing lenses). While embodiments are generally described as using lasers such as VCSELs, other types of light emitting elements, for example light emitting diodes (LEDs), may be used in some embodiments. The VCSELs may be grouped into laser modules, for example with each group or module including a red VCSEL, a blue VCSEL, and a green VCSEL. In some embodiments, each of the collimated light beams may be configured to include a diameter of less than sixty (60) micrometers. In some embodiments, the curved mirror may be an ellipsoid mirror. In some embodiments, the curved mirror may include a partially-reflective layer configured to transmit at least a portion of external light through the curved mirror to the eye, where the external light is incident on an opposite surface of the curved mirror relative to the collimated light beams incident on the internal surface of the curved mirror. In some embodiments, the system may include one or more gaze tracking modules configured to monitor the orientation of one or more eyes and transmit the eye orientation data to the processor, where the processor is configured to dynamically select one or more active portions of the light emitting device and the scanning mirror based at least on the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In some embodiments, a method for a VR/AR device may include generating, by a light emitting device that may include one or more light emitting elements (e.g., laser modules), one or more collimated light beams. The method may also include selectively activating, by a processor connected to the light emitting device, one or more groups of the light emitting elements. In some embodiments, the method may include dynamically tilting, by the processor, each of one or more microelectromechanical systems (MEMS) mirrors of a scanning mirror in at least one of two orthogonal degrees of freedom. Additionally, the method may include raster scanning, by the scanning mirror, the collimated light beams over multiple angles corresponding to a field of view of an image. Furthermore, the method may include reflecting, by a curved (e.g., ellipsoid) mirror that may include curves in two orthogonal directions, the collimated light beams from the scanning mirror into a subject's eye in proximity to the curved mirror. In some embodiments, the method may include generating, by the collimated light beams, a virtual reality view that may include the image. In some embodiments, the raster scanning may include generating, by the collimated light beams and over a second set of multiple angles, a second field of view in response to a determination, by the processor and based on the eye orientation data, that the eye has moved to a second orientation. In some embodiments, the method may include generating, by the collimated light beams, an augmented reality view that may include virtual images generated by the collimated light beams combined with a real-world view provided by external light that passes through the curved mirror.

In some embodiments, a VR/AR device may include a frame configured to be worn on the head of a user (also referred to as a subject). In some embodiments, the device may include first and second light emitting devices connected to the frame, where the first and second light emitting devices may include respective first and second sets of light emitting elements configured to generate respective first and second sets of collimated light beams. A processor connected to the first and second light emitting devices may be configured to selectively activate one or more groups of the respective ones of the first and second sets of light emitting elements. First and second scanning mirrors connected to the frame may include respective sets of one or more microelectromechanical systems (MEMS) mirrors. Each MEMS mirror of the first and second scanning mirrors may be configured to dynamically tilt in at least one of two orthogonal degrees of freedom in response to instructions received from the processor. Each MEMS mirror of the first and second scanning mirrors may also be configured to raster scan the light beams over multiple angles corresponding to a field of view of an image. First and second curved (e.g., ellipsoid) mirrors connected to the frame may each include curves in two orthogonal directions. The first curved mirror may be configured to reflect the first set of collimated light beams from the first scanning mirror into a first eye in proximity to the first curved mirror. The second curved mirror may be configured to reflect the second set of collimated light beams from the second scanning mirror into a second eye in proximity to the second curved mirror.

Figure 1:
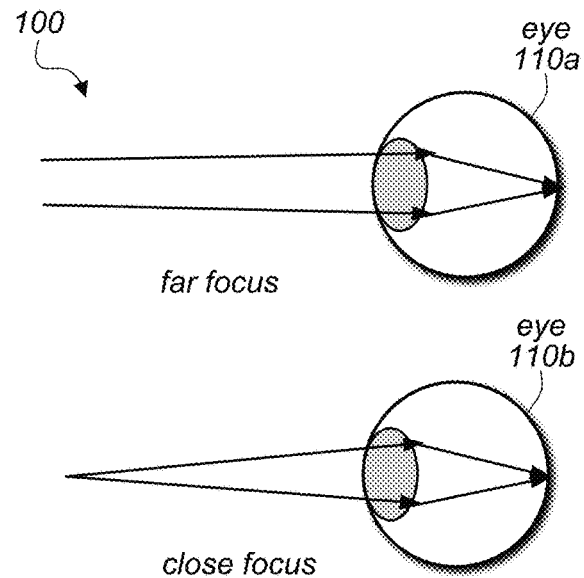
FIG. 1 illustrates different types of eye focus.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of a virtual reality device are described that implement direct retinal scanning technology to scan high-resolution virtual reality images directly to a subject's retinas, thus reducing, minimizing, or eliminating the effects of accommodation-convergence mismatch. Some embodiments of a virtual reality device as described herein may also employ gaze tracking technology to adapt the projection of the virtual images according to the orientation and spacing of the subject's eyes. Some embodiments of a virtual reality device as described herein may also provide augmented reality by using partially reflective curved mirrors that reflect virtual images to the subject's eyes, while allowing a portion of external light to pass through the curved mirrors to the subject's eyes.

A virtual reality (VR) or augmented reality (AR) system (e.g., a headset system) may implement many different techniques or components to resolve the convergence-accommodation conflict in a head mounted display. The human brain typically uses two cues to gauge distance: accommodation (i.e., eye focus) and eye convergence (i.e., the stereoscopic perspective difference between the two eyes). Conventional near-eye VR systems typically use separate miniature screens for each respective eye to project the images intended for the left eye and the right eye, as well as optics to allow a subject to comfortably focus their eyes at a far distance during viewing of the left eye and right eye images. Conventional near-eye VR systems thus produce conflicting visual cues since the resulting three-dimensional (3D) image produced by the brain effectively appears at a convergence distance that is closer than the accommodation distance that each eye focuses on separately, thereby leading to the possibility of headache and/or nausea over time. Heavy users of conventional VR systems may potentially train themselves to compensate for accommodation-convergence mismatch, but a majority of users might not.

AR systems typically add information and graphics to an existing scene being viewed by a user. In some embodiments, AR may be a powerful experience, since the user can see both the projected images and/or sprites (i.e., the augmented world) as well as the surrounding scene (i.e., the real world) directly through the AR system rather than using camera systems to project a version of the surrounding scene less accurately onto screen displays for each eye.

FIG. 1 depicts an example of different types of eye focus. In system 100 of FIG. 1, a subject's eye 110A may focus at a far distance, as shown by the incident light originating from a distant location and focusing onto the retina (i.e., the back internal surface) of eye 110A by the internal lens of eye 110A. In another embodiment, a subject's eye 110A may instead focus at a near distance, as shown by light from a nearby location being incident upon the subject's eye and focusing onto the retina.

Figure 2:
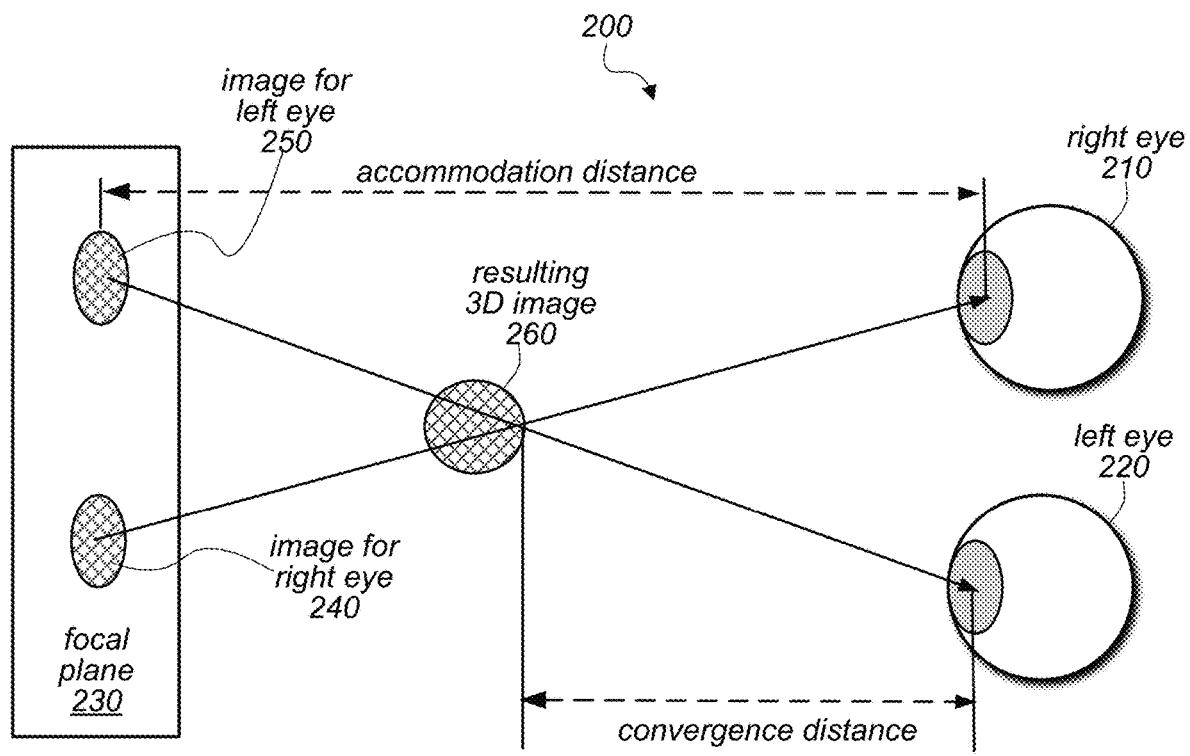
FIG. 2 illustrates a conventional near-eye virtual reality system.

FIG. 2 illustrates a conventional near-eye VR system 200. As depicted, a subject's right and left eyes 210 and 220 are focused on a focal plane 230 where an image for right eye 240 and an image for left eye 250, respectively, are displayed. As the subject's right eye 210 and left eye 220 focus on their respective images on focal plane 230, the brain of the subject combines the images into a resulting 3D image 260. The accommodation distance may be the distance between focal plane 230 and an eye of the subject (e.g., right eye 210 and/or left eye 220), and the convergence distance may be the distance between resulting 3D image 260 and an eye of the subject. Since, as depicted in FIG. 2, the accommodation distance differs from the convergence distance, conventional near-eye VR system 200 therefore results in an accommodation-convergence mismatch and may cause discomfort for the user as described above.

Figure 3:
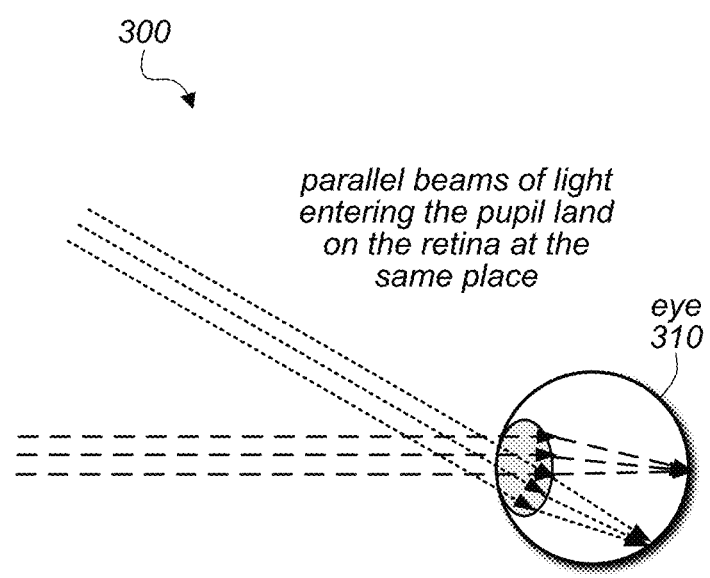
FIG. 3 illustrates an example of parallel light beams entering a subject's eye.

System 300 of FIG. 3 illustrates an example of parallel light beams entering a subject's eye 300. As shown, various sets of parallel light beams that enter the subject's eye 300 are focused by the eye 300 such that the parallel beams within a respective set land at the same place on the retina of the eye 300.

In embodiments of a VR/AR device as described herein, the problems discussed above with respect to accommodation-convergence mismatches when generating VR and/or AR image(s) may be solved by scanning narrow collimated beams of light directly to the retinas of a subject's eyes. In various embodiments, the narrow collimated beams of light may be produced by scanning one or more light sources (e.g., red, green, blue (RGB) lasers) into the subject's eye(s), thereby producing a light field corresponding to the VR and/or AR image(s). In some embodiments, a small beam diameter (e.g., a beam diameter smaller than the pupil of the subject's eye) may enable the system to produce a larger depth of focus and reduce the impact of eye accommodation. For example, the use of parallel beams having small beam diameters may reduce accommodation-convergence mismatch and thus help correct eye problems. In some embodiments, the focus of one or more light beams may be adjusted through a slow axis scan, thereby maintaining beam collimation and/or divergence.

In some embodiments, a VR and/or AR headset system may reduce and/or eliminate accommodation-convergence mismatch problems by scanning narrow collimated beams of light to generate a light field at the subject's eyes. In some embodiments, an F-number calculation for such a system may be described as follows. If a human eye has a focal length of 17 mm at infinity and a focal length of 15.7 mm at a 200 mm focus, then a hyperfocal distance (h) may be approximately equal to 1500 mm. This may ensure an optimal focus over the depth of field of 750 mm to infinity. Assuming a visual acuity of approximately 1 arc minute, this corresponds to a notional "pixel" size of 5 micrometers (μm) (i.e., p), and thus the F-number would be defined by the equation: F-number=$f^2/(h*p)$=38.5, which would result in a required aperture of 440 micrometers (μall). Therefore, a beam diameter of 440 μm entering a subject's eye may provide visual acuity for object distances from 750 mm to infinity, regardless of how the internal lens of the subject's eye is accommodated. The angle of a light beam entering the subject's eye is an important factor in determining the placement of the light with respect to the image seen by the subject's eye, while the position of the light beam with respect to the pupil itself may not be an important factor. Such a system could thus be configured to provide VR and/or AR images to the eyes of the subject while maintaining the subject's comfort. An additional benefit of such a system is that the system may be configurable to adapt to and correct a subject's existing eye problems (e.g., long-sightedness, short-sightedness, or a general reduced ability for accommodation), while still allowing sharp, high-resolution images to be received on the subject's retina.

In some embodiments, a laser module (e.g., a laser module suitable for use in a projector system) may be utilized in a VR/AR device (e.g., headset system). In some embodiments, a laser module may include three separate lasers with different colors, such as red, green, and blue. While embodiments are generally described as using lasers (e.g., VCSELs), other types of light emitting elements, for example light emitting diodes (LEDs), may be used in some embodiments. Beam splitters and reflectors may also be used to superpose the beams emitted by the lasers to a single RGB beam, which may then be scanned using a scanning mirror. In some embodiments, the scanning mirror may be a two-dimensional (2D) microelectromechanical (MEMS) mirror. In some embodiments, the scanning mirror may be a three-dimensional (3D) MEMS mirror. In some embodiments, a single laser module and a single adjustable scanning mirror may be used (with one set for each eye). In some embodiments, an array of MEMS mirrors may be used to raster scan multiple light beams from an array of laser modules (with two sets of laser/mirror arrays, one for each eye). In some embodiments, the scanning mirror may be placed at or close to one of the foci of a curved mirror, such as an ellipsoid mirror, and the pupil of the subject's eye may be positioned at or close to the other focus of the curved mirror. In such a system, the scanning mirror may be scanned to direct light from the laser modules into the subject's eye and thereby generate a light field corresponding to one or more VR images or AR images. In some embodiments, during a raster scan each laser may be appropriately modulated based at least in part on the desired intensity and color of each location in the projected image.

In some embodiments, a VR headset may continue to focus a light field into the eye of a subject across multiple potential pupil positions. If the subject's pupil moves with respect to the azimuth (i.e., horizontal angle), the subject's pupil may no longer be at a focus of the ellipsoid mirror, and the rays corresponding to the light field may no longer focus to a point. However, so long as the beams converge sufficiently to enter the subject's pupil, the collimated light beams may be correctly focused onto the retina of the subject's eye. As stated above, parallel beams of light entering the subject's pupil land on the retina at the same place, and consequently the position, to the first order, of the beam within the subject's pupil may not be relevant to the focus of the collimated light beams on the subject's retina.

In some embodiments, a laser aperture of approximately 2 millimeters (mm) to 3 mm may be utilized. At the diffraction limit, such a laser may be capable of an angular resolution at the subject's eye of approximately 3 arc minutes for a 2 mm aperture and 2 arc minutes for a 3 mm aperture. For reference, 20/20 vision roughly corresponds to 1 arc minute. Such a laser may also be capable of a hyperfocal distance of 1 meter (m) for a 2 mm aperture and 2.5 m for a 3 mm aperture. Therefore, for a 2 mm aperture, the image at the subject's eye may be in focus on the subject's retina if accommodated from 0.5 m to infinity. Similarly, for a 3 mm aperture, the image at the subject's eye may be in focus on the subject's retina if accommodated from 1.3 m to infinity.

In some embodiments, diffraction limit calculations may be based on the far-field estimate of the beam parameter product (BPP). BPP corresponds to $(\Delta x)*\Delta\alpha/4 \geq \lambda/\pi$, where $\Delta x$ is the beam width; $\Delta\alpha$ is the beam divergence angle; $\lambda$ is the light wavelength; and $\lambda/\pi$ is the diffraction limit (0.175 mm mrad for 550 nm light). The Fresnel number $(N)=(\Delta x)^2/(\lambda*L)$ indicates whether the beam is in the near field or far field, where L is the distance from the aperture to the point of interest. In some embodiments, L may be approximately 127 mm, although this is just an example and should not be considered to be limiting. As example values of N, for a 2 mm aperture N may be approximately 14, and for a 3 mm aperture N may be approximately 32. Values of N<0.2 may correspond to a far-field where the beam may be assumed to be Gaussian. If N>100, diffraction effects may be ignored.

In the above discussion of the range of N, the Fresnel diffraction region and the near field are assumed. Thus, the diffraction limit equations used in the discussion are not correct, as beam divergence ($\Delta\alpha$) is not defined for the near field. In practice, however, the beam performance may be better than predicted by the far field numbers.

The techniques described herein for a VR/AR device may be further illustrated in terms of an example VR/AR headset system that employs them. As noted above, these techniques may be implemented in any type of display device, apparatus, optical projection system, or computing system that includes the capability to process and display image and/or video data.

Figure 4:
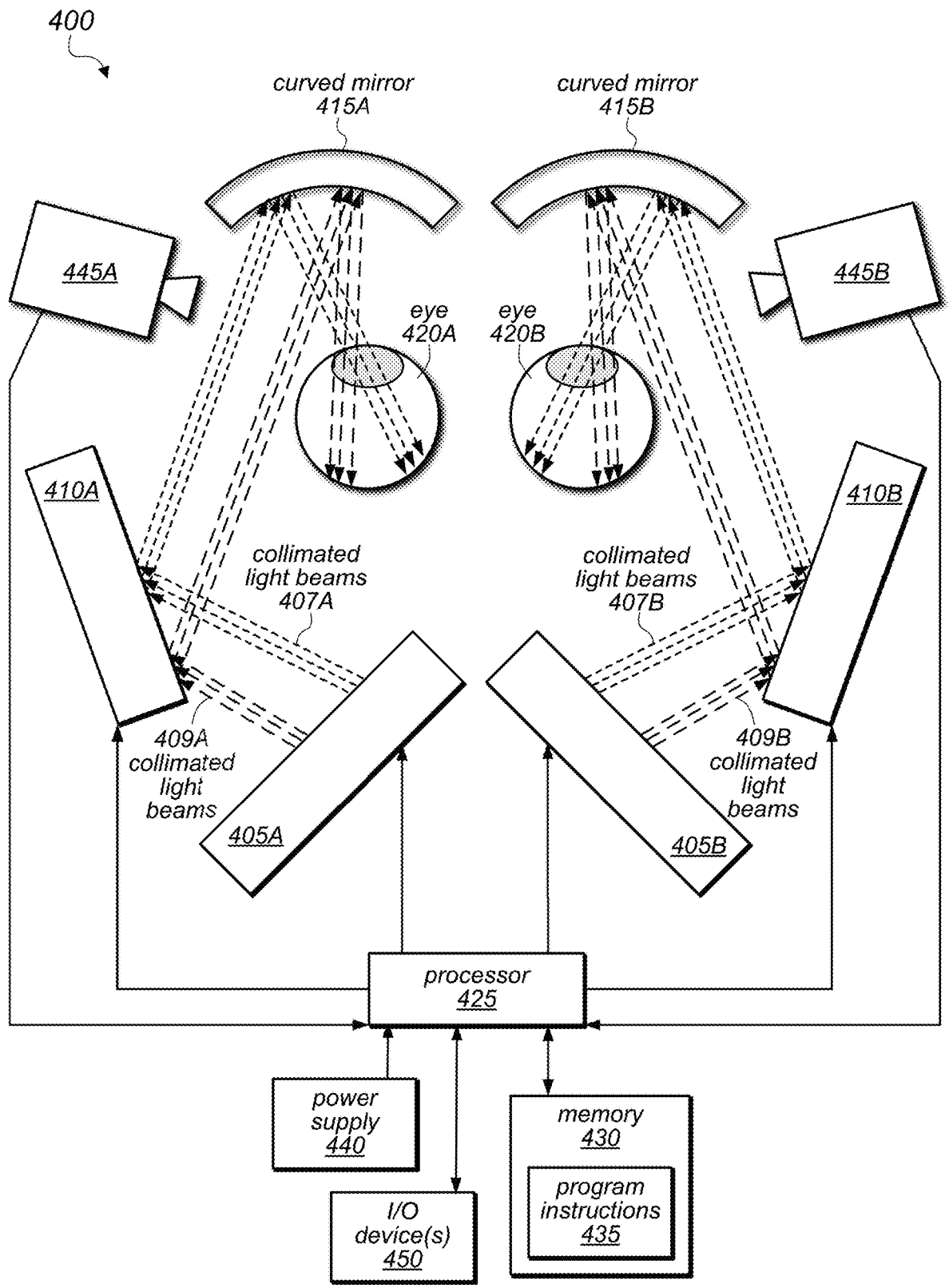
FIG. 4 is logical block diagram of a virtual reality (VR) and/or augmented reality (AR) device, according to some embodiments.

One example of a system that is configured to implement any or all of the techniques described herein is illustrated in FIG. 4. For example, system 400 illustrated in FIG. 4 may be configured as a virtual reality headset, according to some embodiments. In the illustrated embodiment, system 400 includes light emitting devices 405A-B coupled to processor 425, scanning mirrors (e.g., MEMS mirror arrays) 410A-B coupled to processor 425, one or more gaze tracking module(s) 445A-B coupled to processor 425, a memory 430, a power supply 440, and one or more input/output (I/O) device(s) 450. As depicted, system 400 also includes a left curved mirror 415A and a right curved mirror 415B, which are configured to reflect collimated light beams 407A into a subject's left eye 420A and to reflect collimated light beams 407B into a subject's right eye 420B, respectively.

In this example, light emitting devices 405A-B may include any type of light emitting elements suitable for emitting light beams, such as vertical cavity surface emitting lasers (VCSELs), light emitting diodes (LEDs), or other devices. In some embodiments, light emitting devices 405A-B may be configured to generate and/or modulate collimated light beams 407A and 407B, respectively. Furthermore, light emitting devices 405A-B may be positioned (e.g., on a frame holding the various elements of system 400), such that light emitting devices 405A-B are oriented to emit collimated light beams at least in the direction(s) of scanning mirrors 410A and 410B, respectively. Various examples of light emitting devices 405A-B are illustrated in FIGS. 5, 7, 8, and 10, which are discussed in detail below. An example of a frame for system 400 is illustrated in FIG. 9, which is discussed in detail below.

In some embodiments, scanning mirrors (e.g., MEMS mirror arrays) 410A-B may be positioned and/or oriented (e.g., on a frame holding the elements of system 400) such that scanning mirrors 410A-B are located at or close to focal points of curved mirrors 415A and 415B, respectively. In some embodiments, processor 425 may selectively control and/or adjust the positions of one or more movable mirror elements in each of scanning mirrors 410A-B in order to generate a raster scan of collimated light beams 407A-B, respectively, into a light field that may be reflected from curved mirrors 415A-B, respectively, and into the subject's eyes 420A-B, respectively. In some embodiments, the subject's eyes 420A-B may be positioned at or near to focal points of curved mirrors 415A-B, respectively. Various examples of scanning mirrors 410A-B and curved mirrors 415A-B are illustrated in FIGS. 5, 6, 10, 12A, and 12B, which are discussed in detail below.

Figure 5:
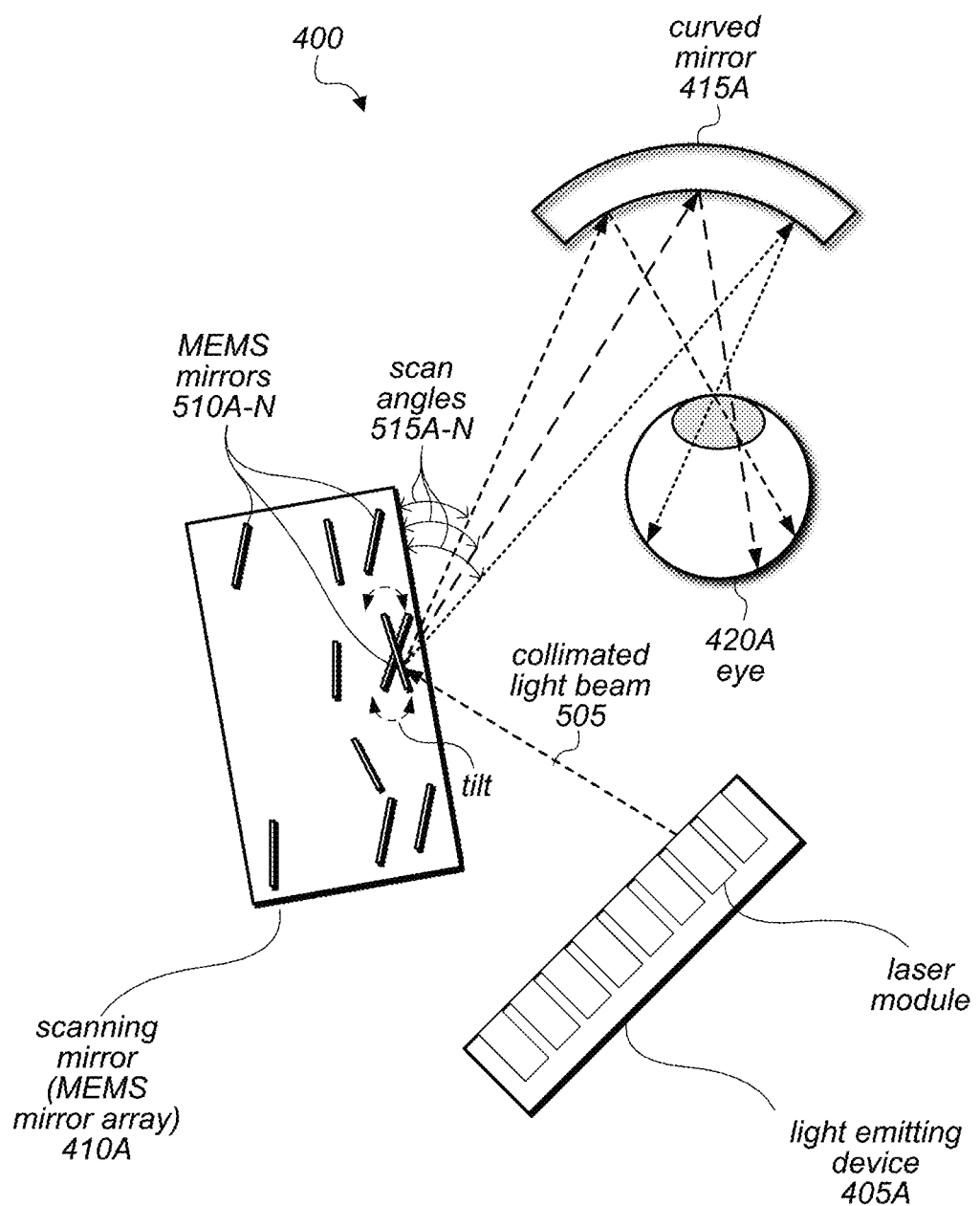
FIG. 5 is a logical block diagram of a raster scan generated using an array of MEMS mirrors, according to some embodiments.

In some embodiments, a light emitting device 405 may include a single laser group or module that includes a red, a green, and a blue laser, and a scanning mirror 410 may include a single MEMS mirror that is used to raster scan a collimated light beam from the light emitting device 405 to generate an image at the subject's respective eye 420. In some embodiments, as illustrated in FIG. 5, a light emitting device 405 may include an array of two or more laser groups or modules, and a scanning mirror 410 may include an array of two or more MEMS mirrors that are used to raster scan multiple collimated light beams from the array of laser modules to generate images at the subject's respective eye 420.

While using the system 400, a subject may move their eyes. In addition, different subject's eyes may be differently spaced. In some embodiments, to avoid distortion in a projected image due to eye orientation and/or spacing, gaze tracking technology may be used to dynamically adjust the virtual image projected by the system 400 according to the subject's current eye orientation and the spacing between the subject's eyes. Gaze tracking module(s) 445A-B may monitor the orientation of the subject's eyes 420A-B and transmit the eye orientation data to the processor 425. The processor 425 may dynamically select one or more active portions of the light emitting device 405 (e.g., one or more laser groups) and of the scanning mirror (e.g., one or more MEMS mirrors) according to the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In different embodiments, system 400 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 400 or processor 425 may include more or fewer elements than those shown in FIG. 4.

In various embodiments, processor 425 may be a uniprocessor system including one processor, or a multiprocessor system including several processors (e.g., two, four, eight, or another suitable number). Processor 425 may include central processing units (CPUs) configured to implement any suitable instruction set architecture, and may be configured to execute instructions defined in that instruction set architecture. For example, in various embodiments processor 425 may be general-purpose or embedded processors implementing any of a variety of instruction set architectures (ISAs), such as the x86, PowerPC, SPARC, RISC, or MIPS ISAs, or any other suitable ISA. In multiprocessor systems, each of processors 425 may commonly, but not necessarily, implement the same ISA. Processor 425 may employ any microarchitecture, including scalar, superscalar, pipelined, superpipelined, out of order, in order, speculative, non-speculative, etc., or combinations thereof. Processor 425 may include circuitry to implement microcoding techniques. Processor 425 may include one or more processing cores each configured to execute instructions. Processor 425 may include one or more levels of caches, which may employ any size and any configuration (set associative, direct mapped, etc.).

In the example system 400 illustrated in FIG. 4, memory 430 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 400 in a chip-on-chip configuration, a package-on-package configuration, or a multi-chip module configuration. In some embodiments, system memory 430 may store pixel data or other image data or statistics in various formats. Similarly, while the example system 400 illustrated in FIG. 4 includes persistent storage for non-volatile storage of image data or other data used in the system, in other embodiments, the system may include other types of non-volatile memory (e.g. read-only memory (ROM)) for those purposes. In some embodiments, memory 430 may include data, such as a program instructions 435 and/or one or more representative maps used by an image signal processor to identify, process, and thereby generate collimated light beams configured to produce a light field corresponding to VR and/or AR image data. One embodiment of an implementation of program instructions 435 is illustrated in more detail in FIG. 11 and described below.

Processor 425 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 450 may include any desired circuitry, depending on the type of system 400. For example, in some embodiments, system 400 may be configured to interface with a mobile computing device (e.g. personal digital assistant (PDA), tablet device, smart phone, etc.), and the I/O devices 450 may include devices for various types of wireless communication, such as WiFi, Bluetooth, cellular, global positioning system, etc. In some embodiments, I/O devices 450 may also include additional storage, including RAM storage, solid state storage, or disk storage. In some embodiments, I/O devices 450 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by or within system 400.

In some embodiments, processor 425 may include an image signal processor (ISP), which may include dedicated hardware that may facilitate the performance of various stages of an image processing pipeline. In some embodiments, processor 425 and/or an ISP may be configured to receive image data from an external source and/or from one or more data files stored in memory 430 and to process the data into a form that is usable by other components of system 400 (including light emitting devices 405A-B, scanning mirrors 410A-B, gaze tracking modules 445A-B, program instructions 435, and/or I/O devices 450). In some embodiments, processor 425 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 400 is merely illustrative and is not intended to limit the scope of embodiments. For example, system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions 435 stored in memory 430 may be executed by processor 425 to provide various functions of system 400.

In some embodiments, various functions may be performed by software components executing in memory on another device and communicating with the illustrated system via inter-computer communication. Some or all of these software components or any data structures described herein may be stored (e.g., as instructions or structured data) in system memory 430, in persistent storage, or may be stored on a non-transitory computer-readable medium or a portable article to be read by an appropriate drive connected to I/O device(s) 450. In some embodiments, instructions stored on a computer-accessible medium separate from system 400 may be transmitted to system 400 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 12A:
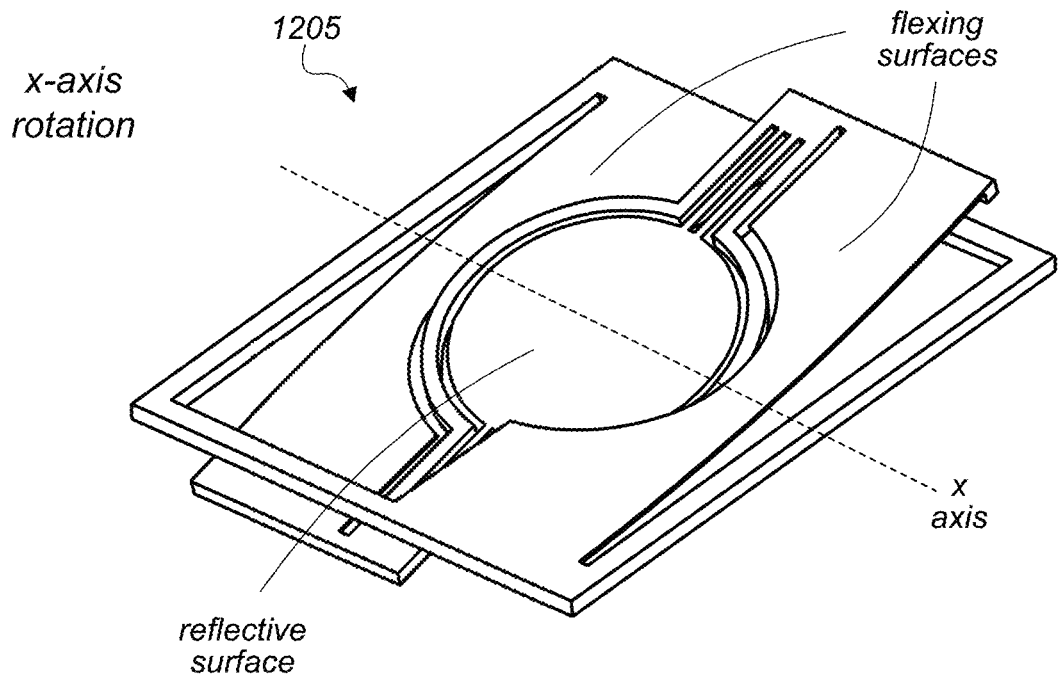
FIGS. 12A and 12B illustrate a dynamically adjustable MEMS mirror that may be used in a VR/AR device, according to some embodiments.
Figure 12B:
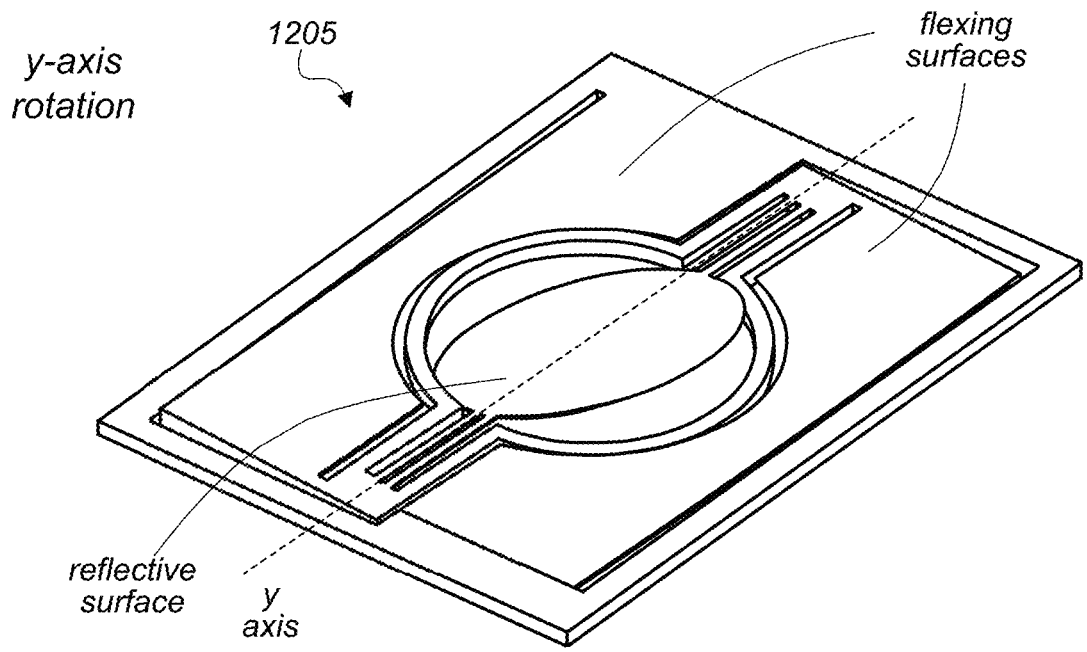

FIG. 5 is an example of a raster scan using an array of MEMS mirrors, according to some embodiments. In some embodiments, MEMS mirrors 510A-N may be configured to tilt according to commands received from processor 425, thereby selectively reflecting collimated light beams across multiple scan angles 515A-N directed towards curved mirror 415A and ultimately into the subject's eye 420A. In some embodiments, each MEMS mirror 510 may be configured to tilt in at least two directions, and the two directions may be orthogonal (e.g., an x-axis and a y-axis). Examples of MEMS mirror 510 tilt configurations are depicted in FIGS. 12A-B, which are described in detail below.

Figure 6:
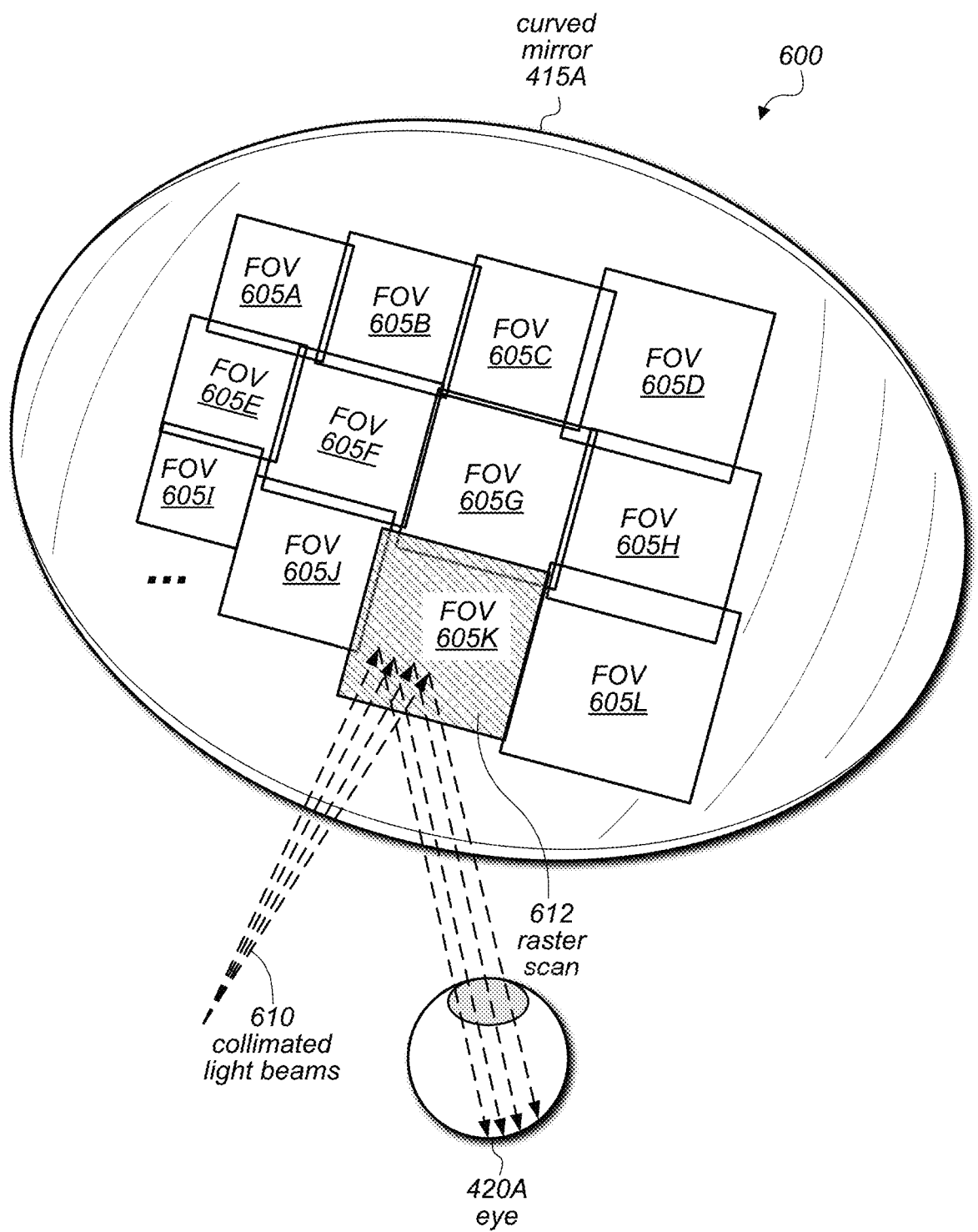
FIG. 6 is a logical block diagram of multiple fields of view, according to some embodiments.

FIG. 6 is an example of multiple fields of view, according to some embodiments. In some embodiments, system 600 may generate collimated light beams 610 that may be raster scanned by a scanning mirror (e.g., a MEMS mirror array as illustrated in FIG. 5) to produce a field of view (FOV), such as FOV 605K of system 600. By selectively modulating one or more light emitting elements (e.g., one or more groupings of RGB lasers) of a respective light emitting device 405, and/or by selectively tilting one or more adjustable mirror elements (e.g., MEMS mirrors) of a respective scanning mirror 410, processor 425 may effectively raster scan collimated light beams 610 across a given FOV, and the FOV may be reflected by curved mirror 415A into a respective eye 420A of the subject. Different MEMS mirror positions in scanning mirrors 410A-B and/or the selective activation of different groups of lasers of the light emitting devices 405A-B may thus accommodate different eye swivel angles as detected by a gaze tracking module 445.

Figure 7:
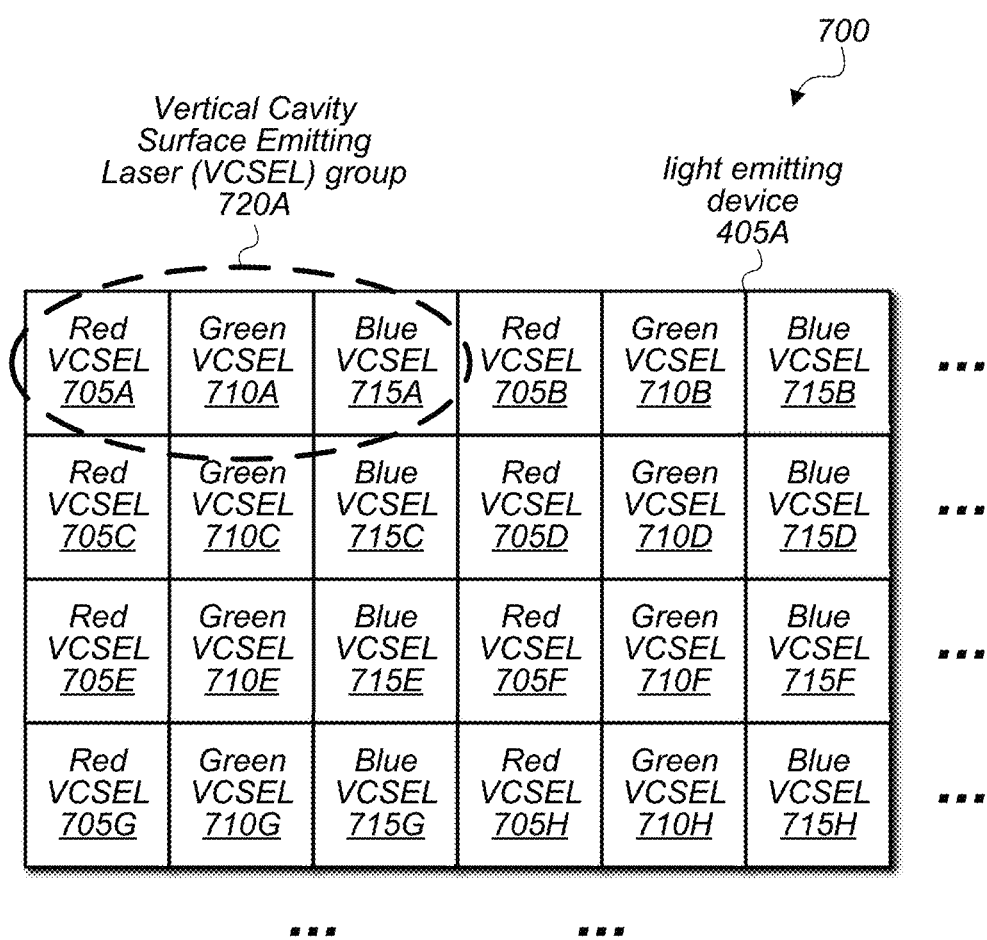
FIG. 7 is a logical block diagram of a configuration of a light emitting device, according to some embodiments.

FIG. 7 depicts an example configuration of a light emitting device, according to some embodiments. As illustrated, system 700 may include light emitting device 405A of FIG. 4. In some embodiments, light emitting device 405A may include multiple VCSEL groups, such as VCSEL group 720A. In some embodiments, each VCSEL group may include multiple colors of lasers (e.g., RGB) usable to generate light corresponding to a pixel pattern of an image. As shown, VCSEL group 720A includes an RGB color pattern having a red VCSEL 705A, a green VCSEL 710A, and a blue VCSEL 715A. In various embodiments, light emitting device 405A may include multiple respective VCSEL groups each configured to represent different pixels of an image and/or different fields of view of a light field. While embodiments are generally described as using VCSELs, other types of light emitting elements, for example light emitting diodes (LEDs), may be used in some embodiments.

Figure 8:
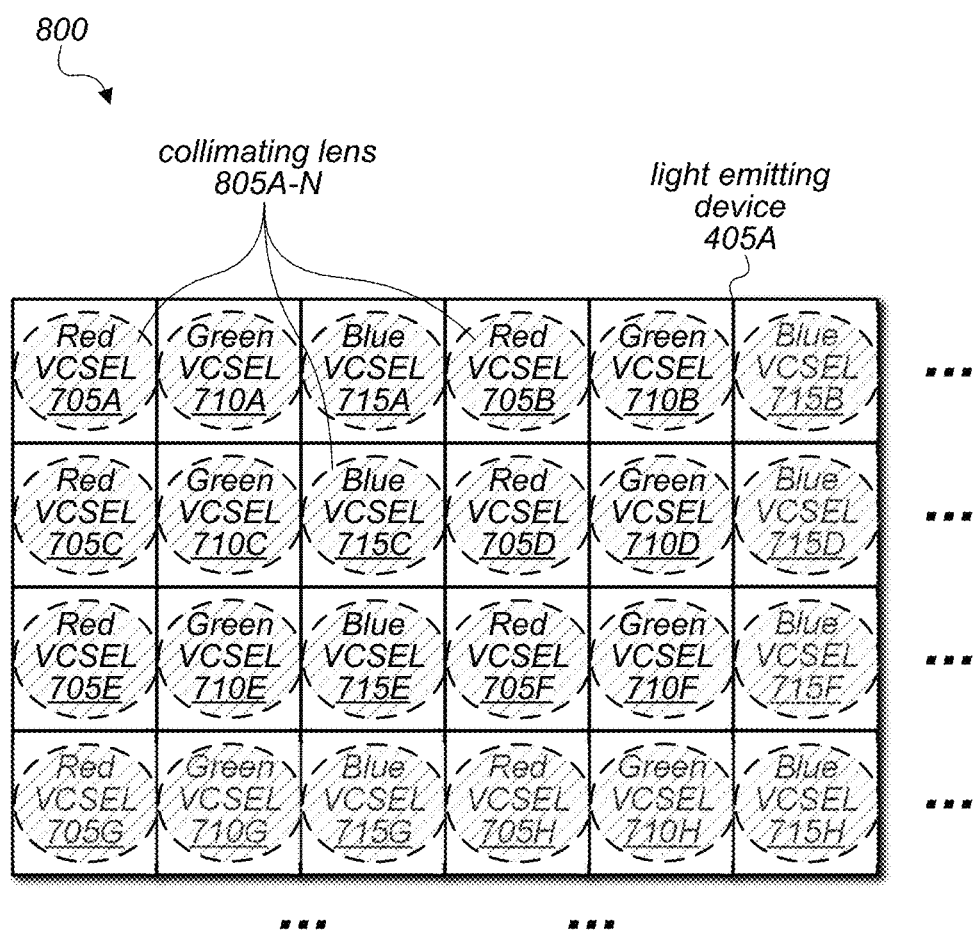
FIG. 8 is a logical block diagram of light source focusing and/or collimating lenses, according to some embodiments.
Figure 9:
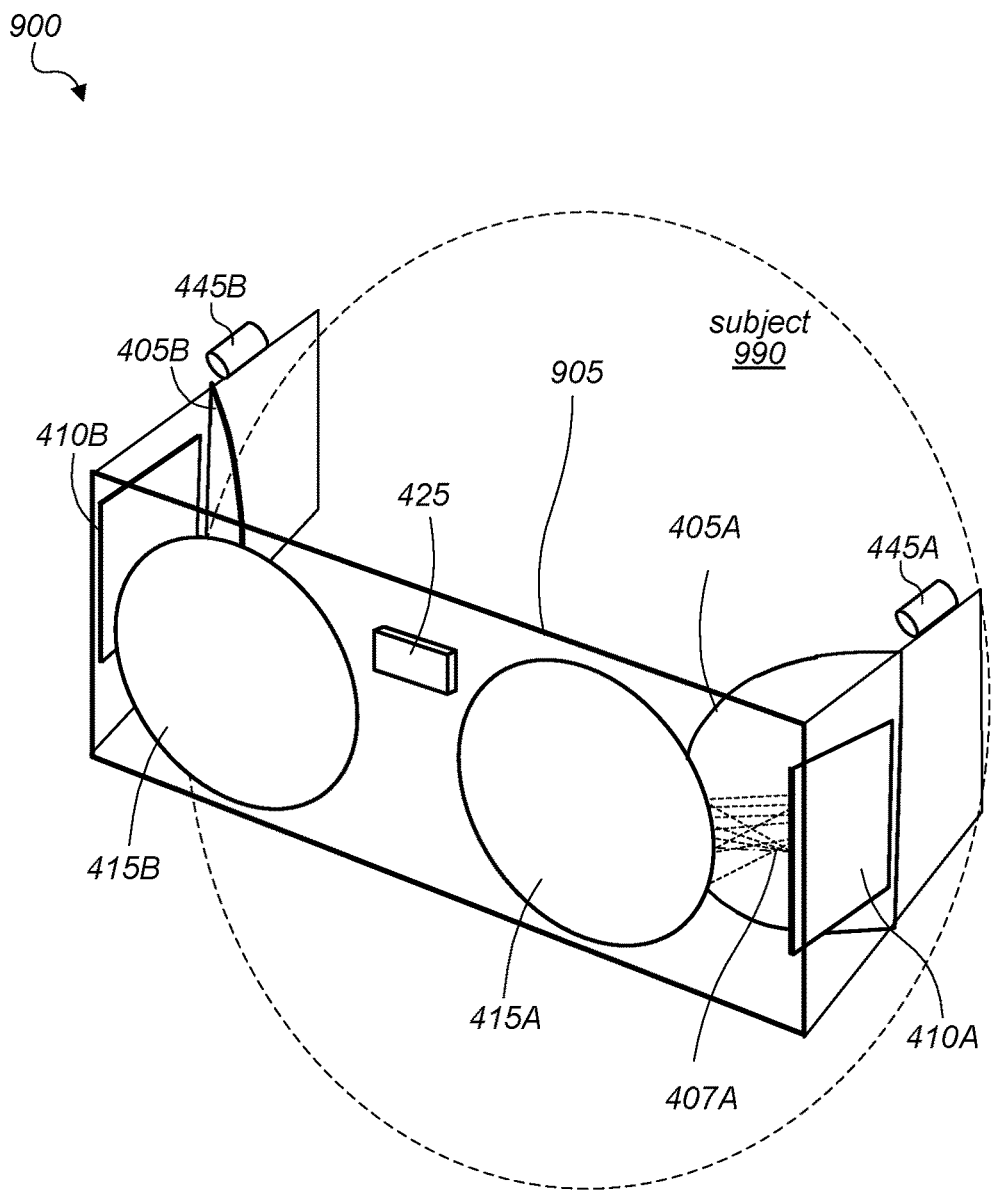
FIG. 9 is a logical block diagram of a frame for a VR/AR device, according to some embodiments.

FIG. 8 illustrates an example of light source focusing and/or collimating lenses, according to some embodiments. As shown, system 800 may include a light emitting device, such as light emitting device 405A of FIG. 4, that includes one or more groups of VCSELs, with one or more collimating lenses 805A-N positioned at or near the output of the VCSELs. In various embodiments, one or more focusing lenses may correspond to one or more respective VCSELs. In some embodiments, one or more apertures may be positioned near the output of the VCSELs to focus and/or collimate the light beams.

FIG. 9 depicts an example of a system 900 including a frame 905, according to some embodiments. As illustrated, frame 905 may be configured to hold various elements of a VR/AR device, such as the elements of system 400 of FIG. 4. In various embodiments, frame 905 may be a glasses frame, a goggles frame, a helmet, or the like, configured to be worn on or over a subject 990's head so as to position the curved mirrors 415A and 415B in front of the subject 990's left and right eyes, respectively.

Figure 10:
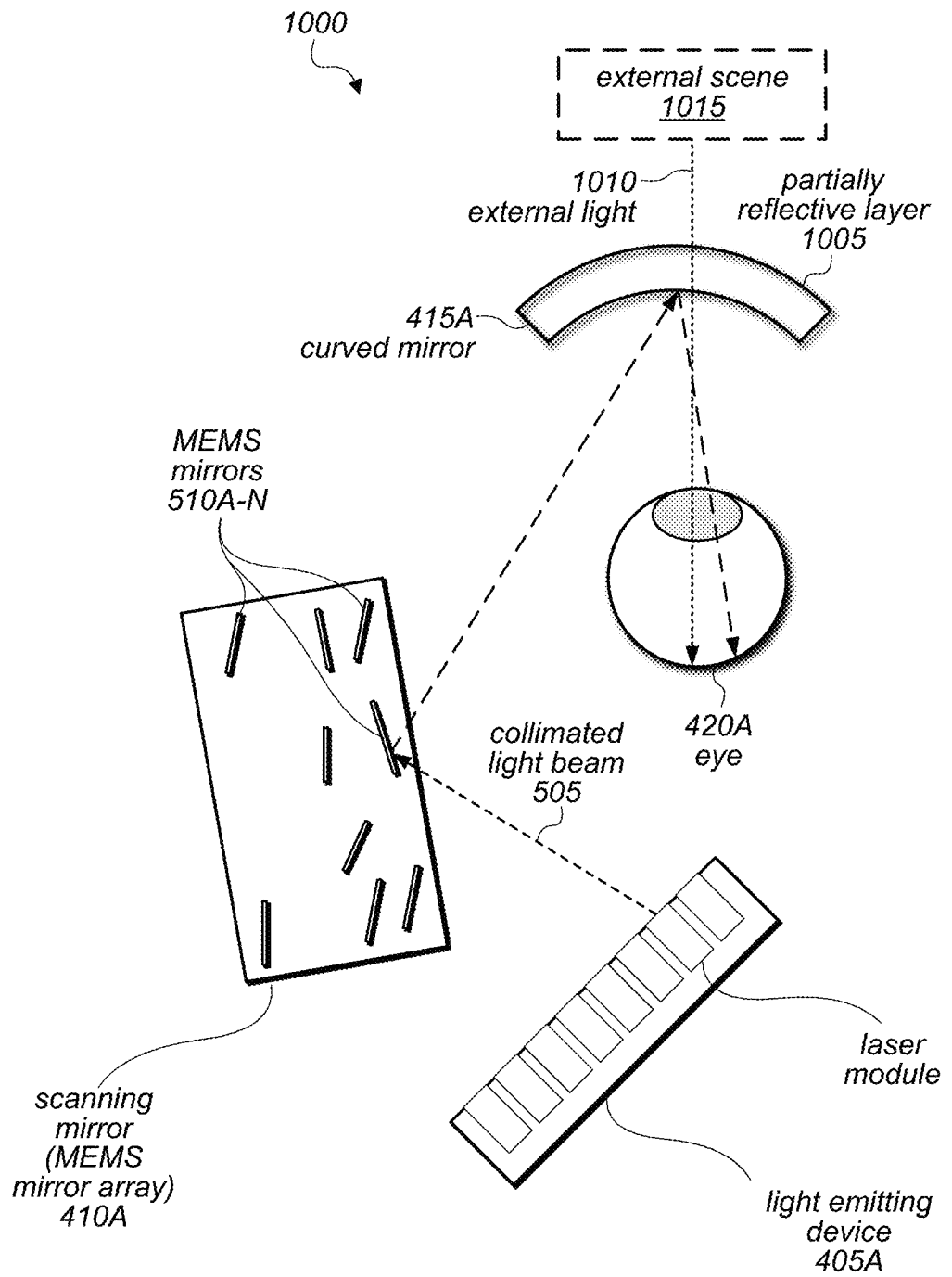
FIG. 10 is a logical block diagram of a device that provides augmented reality (AR) to a subject, according to some embodiments.

FIG. 10 illustrates an example of a system 1000 configured for augmented reality (AR), according to some embodiments. In some embodiments, a curved mirror, such as curved mirror 415A of FIG. 4, may include a partially reflective layer 1005 configured to allow a portion of external light 1010 from an external scene 1015 to pass from an opposite surface of curved mirror 415A through curved mirror 415A and reach the subject's eye 420A, while simultaneously reflecting collimated light beam 505 from an internal surface of curved mirror 415A towards the subject's eye 420A. In various embodiments, partially reflective layer 1005 may be a partially-silvered mirror, or the like. Augmented reality system 1000 thus enables the subject to see elements of both an external scene 1015 and the images corresponding to collimated light beam 505 (i.e., the field of view generated by light emitting device 405A and scanning mirror 410A raster scanning collimated light beam 505 across the inside surface of curved mirror 415A).

FIGS. 4-10 provide an example of a VR/AR device which may generate virtual reality or augmented reality images. However, numerous other types or configurations of systems or devices that implement virtual reality or augmented reality may be included in a VR/AR device.

Figure 11:
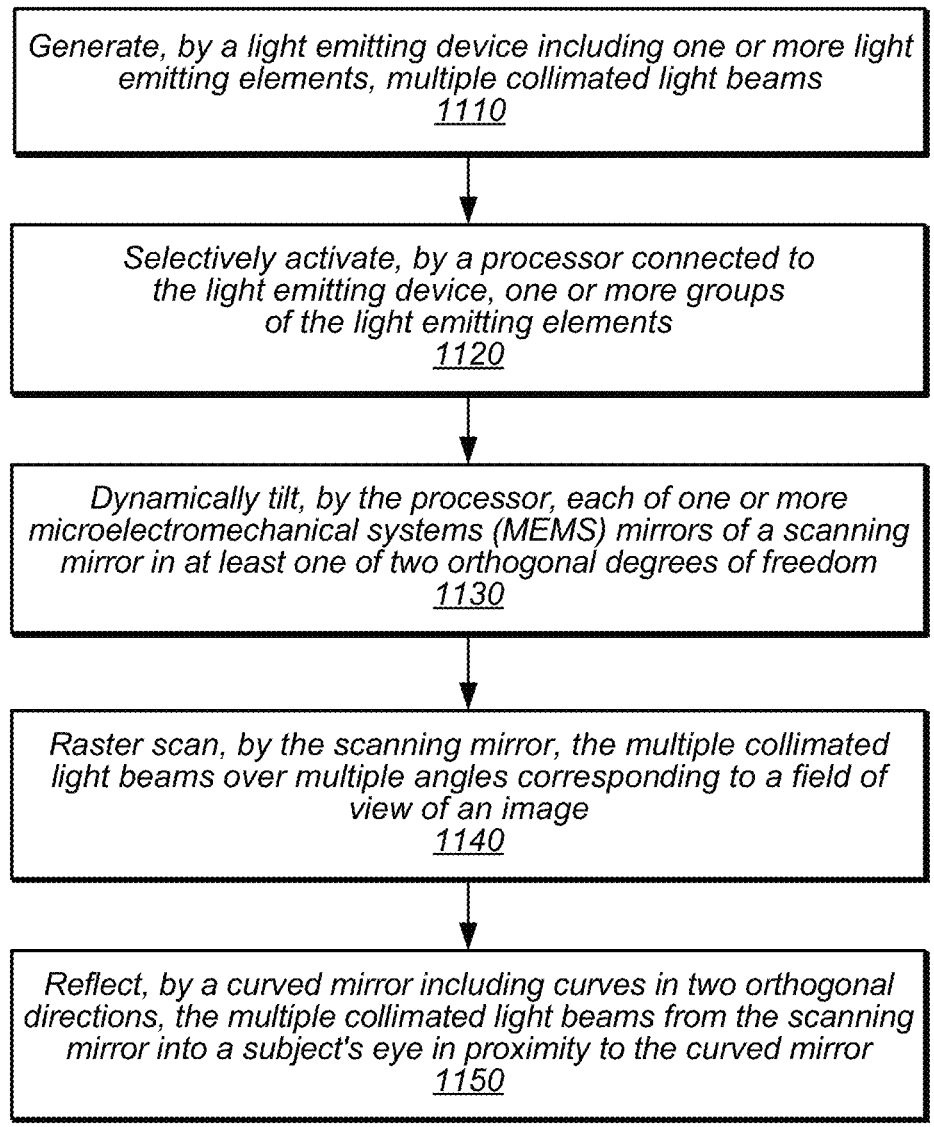
FIG. 11 is a high-level flowchart illustrating a method of operation for a virtual reality device, according to some embodiments.

FIG. 11 is a high-level flowchart illustrating a method of operation for a VR/AR device, according to some embodiments. The method of FIG. 11 may, for example, be implemented by embodiments of a VR/AR device as illustrated in FIGS. 4-10. In addition, in some embodiments, a VR/AR device may implement other methods and techniques such as those described below with regard to FIGS. 12A-13. In some embodiments, a VR/AR device may further include technology, such as one or more image signal processors and/or image processing pipelines, that may apply one or more image processing techniques to virtual reality or augmented reality images.

As indicated at 1110, a light emitting device including one or more light emitting elements generates one or more collimated light beams. In some embodiments, the light emitting elements may be vertical cavity surface-emitting lasers (VCSELs) with respective focusing and/or collimation elements (e.g., dynamically adjustable focusing lenses).

In some embodiments, the VCSELs may be organized in groups, with each group including a red VCSEL, a blue VCSEL, and a green VCSEL. As indicated at 1120, a processor connected to the light emitting device selectively activates one or more groups of the light emitting elements. As indicated at 1130, the processor dynamically tilts each of one or more MEMS mirrors of a scanning mirror in at least one of two orthogonal degrees of freedom. As indicated at 1140, the scanning mirror raster scans the multiple collimated light beams over multiple angles corresponding to a field of view of an image. As indicated at 1150, a mirror (e.g., an ellipsoid mirror) curved in two orthogonal directions reflects the collimated light beams from the scanning mirror into a subject's eye in proximity to the curved mirror. The collimated light beams reflected by the curved mirror may provide a virtual reality view to the subject.

FIGS. 12A and 12B illustrate embodiments of dynamically adjustable MEMS mirrors, according to some embodiments. As depicted in FIG. 12A, MEMS mirror 1205 may be configured to rotate a reflective surface across an x-axis based on an electrical current applied to MEMS mirror 1205 that changes the magnetic field(s) of a piezoelectric material applied to the flexing surfaces of the MEMS mirror 1205 in relation to a substrate of the MEMS mirror 1205, thereby causing the flexing surfaces to bend which results in rotating a reflective surface of the MEMS mirror 1205 in relation to the x-axis. Similarly, FIG. 12B depicts a reflective surface of MEMS mirror 1205 rotating across a y-axis in response to an electrical current that differently alters the magnetic field(s) of the piezoelectric material applied to the flexing surfaces of the MEMS mirror 1205, thereby causing the flexing surfaces to differently bend which results in rotating a reflective surface of the MEMS mirror 1205 in relation to the y-axis. In some embodiments, a scanning mirror may include multiple such MEMS mirrors 1205 configured to dynamically rotate in two orthogonal directions in response to commands from a processor.

Figure 13:
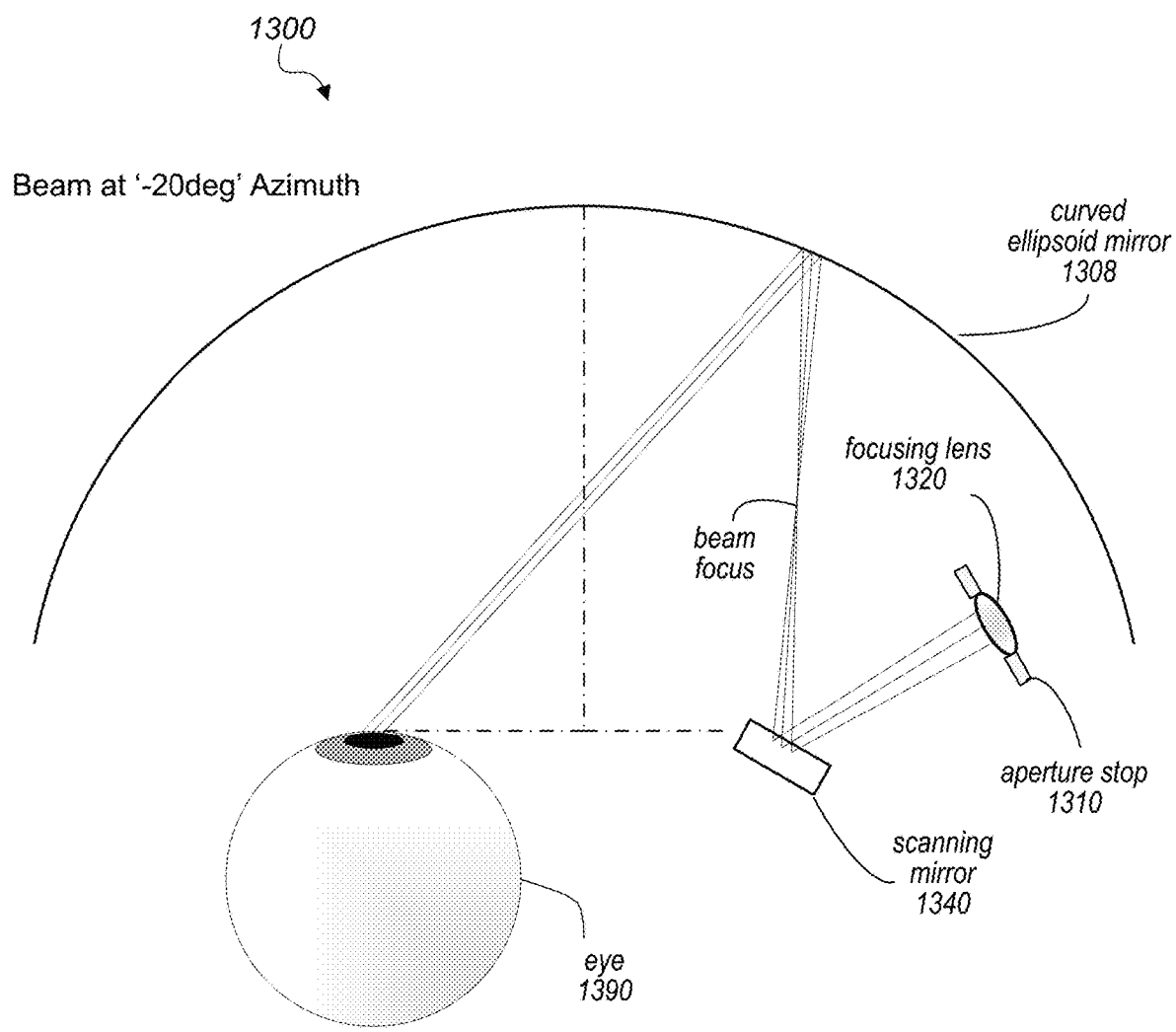
FIG. 13 illustrates a focusing device in a VR/AR device, according to some embodiments.

FIG. 13 illustrates an example adjustable focusing device in an example virtual reality device, according to some embodiments. The ellipsoid mirror 1308 may act as a focusing element (e.g., like a lens), and hence the beam may be focused close to the mirror 1308's focal length so that the reflected beam is almost collimated. A beam typically does not want to be collimated and may in some cases be slightly divergent, as corresponds to an object at a hyperfocal distance. In some embodiments, in order to achieve a correctly divergent beam entering the pupil of a subject's eye, the focal length of a focusing device may need to be adjusted through a slow (e.g., horizontal) axis scan. Such an adjustment may not be necessary for a fast (e.g., vertical) axis scan as the ellipsoid mirror 1308 geometry is the same for different fast axis angles. Thus, a dynamically adjustable focusing device, such as focusing lens 1320 and/or aperture stop 1310, may be used to adjust focus of the beam prior to the beam being directed to the ellipsoid mirror 1308 by the scanning mirror 1340. In some embodiments, a solid state focusing device, such as a liquid crystal display (LCD) based focusing element, may be utilized to provide a fast and adjustable response time.

A virtual reality device as described herein may thus scan high-resolution virtual reality images to a subject's retinas, and may reduce, minimize, or eliminate the effects of accommodation-convergence mismatch. Some embodiments of a virtual reality device as described herein may also employ gaze tracking technology to adapt the projection of the virtual images according to the orientation and spacing of the subject's eyes. Some embodiments of a virtual reality device as described herein may also provide augmented reality by using partially reflective curved mirrors that reflect virtual images to the subject's eyes, while allowing a portion of external light to pass through the curved mirrors to the subject's eyes.

What is claimed is:

1. A system, comprising:
   a light emitting device comprising a plurality of light emitting elements configured to generate collimated light beams;
   a processor connected to a scanning mirror array and the light emitting device and configured to selectively activate one or more of the plurality of light emitting elements and different individual ones of the scanning mirror array;
   a curved mirror comprising curves in two orthogonal directions;
   the scanning mirror array comprising a plurality of microelectromechanical systems (MEMS) mirrors, wherein individual ones of the array of mirrors are:
      physically positioned to accommodate different eye orientation data; and
      configured to:
         dynamically tilt in at least one of two orthogonal degrees of freedom in response to instructions received from the processor; and
         raster scan a collimated light beam from the light emitting device to the curved mirror over a plurality of angles corresponding to a field of view of an image;
   wherein the curved mirror is configured to reflect the scanned collimated light beams from the scanning mirror to a subject's eye in proximity to the curved mirror; and
   wherein the processor is configured to selectively activate different individual ones of the scanning mirror array to accommodate different eye orientation data.

2. The system of claim 1, wherein the plurality of light emitting elements include a plurality of lasers and a plurality of dynamically adjustable focusing elements configured to adjust beam divergence entering a pupil of the subject's eye for different angles of a slow axis of the raster scan to maintain appropriate beam divergence across the field of view.

3. The system of claim 1, wherein the plurality of light emitting elements include a plurality of laser modules, each laser module including a red laser, a blue laser, and a green laser.

4. The system of claim 1, wherein the curved mirror is an ellipsoid mirror, wherein the scanning mirror array is located at or near a first focus of the ellipsoid mirror, and wherein the subject's eye is located at or near a second focus of the ellipsoid mirror.

5. The system of claim 1, wherein the curved mirror comprises a partially-reflective layer configured to transmit at least a portion of external light through the curved mirror to the subject's eye, wherein the external light is incident on an opposite surface of the curved mirror relative to the collimated light beams incident on an internal surface of the curved mirror.

6. The system of claim 1, further comprising a gaze tracking module configured to:
   monitor orientation of the subject's eye to determine eye orientation data; and
   provide the eye orientation data to the processor, wherein the processor is configured to dynamically select one or more active portions of the light emitting device array and the MEMS array based at least on the eye orientation data and a respective field of view corresponding to the one or more active portions of the light emitting device array and the MEMS array.

7. The system of claim 1, wherein:
the light emitting device comprises a plurality of laser modules, each laser module comprising a red, a green, and a blue laser;
different ones of the laser modules are associated with respective fields of view; and
the processor is configured to tilt one or more mirrors of the MEMS mirror array and selectively activate one or more of the laser modules to raster scan collimated light beams across a field of view corresponding to the selectively activated one or more laser modules to accommodate different eye swivel angles.

8. A method, comprising:
generating, by a light emitting device comprising light emitting elements, collimated light beams;
selectively activating, by a processor, different individual ones of a plurality of microelectromechanical systems (MEMS) mirrors of a scanning mirror array to accommodate different eye orientation data, wherein individual ones of the MEMs mirrors are physically positioned to accommodate different eye orientation data;
raster scanning, by the plurality of MEMS mirrors, collimated light beams from the light emitting device to a curved mirror over a plurality of angles corresponding to a field of view of an image; and
reflecting, by the curved mirror comprising curves in two orthogonal directions, the collimated light beams from the plurality of MEMS mirrors to a subject's eye in proximity to the curved mirror.

9. The method of claim 8, wherein the collimated light beams reflected by the curved mirror provide a virtual reality view comprising the image to the subject.

10. The method of claim 8, further comprising:
monitoring, by a gaze tracking module, orientation of the subject's eye to determine eye orientation data; and
providing, by the gaze tracking module, the eye orientation data to the processor.

11. The method of claim 10, wherein the raster scanning further comprises generating, by the one or more of the collimated light beams and over a second plurality of angles, a second field of view in response to a determination, by the processor and based on the eye orientation data, that the subject's eye has moved to a second orientation.

12. The method of claim 8, wherein the curved mirror comprises a partially-reflective layer, the method further comprising transmitting, by the curved mirror, at least a portion of external light through the curved mirror to the subject's eye, wherein the external light is incident on an opposite surface of the curved mirror relative to the collimated light beams incident on an internal surface of the curved mirror.

13. The method of claim 12, further comprising generating, by the collimated light beams, an augmented reality view comprising the image and a real scene based on the at least a portion of external light transmitted through the curved mirror.

14. A device, comprising:
a frame configured to be worn by a user;
first and second light emitting devices connected to the frame and comprising respective first and second pluralities of light emitting elements configured to generate respective first and second pluralities of collimated light beams;
a processor connected to a first and second scanning mirror arrays and the first and second light emitting devices and configured to selectively activate one or more groups of respective ones of the first and second pluralities of light emitting elements and different individual ones of the first and second scanning mirror arrays;
first and second curved mirrors connected to the frame and each comprising curves in two orthogonal directions; and
the first and second scanning mirror arrays connected to the frame and comprising respective pluralities of microelectromechanical systems (MEMS) mirrors, wherein individual MEMS mirrors of the first and second scanning mirror arrays are:
physically positioned to accommodate different eye orientation data; and
configured to:
dynamically tilt in at least one of two orthogonal degrees of freedom in response to instructions received from the processor; and
raster scan respective ones of the first and second pluralities of collimated light beams from a respective one of the light emitting devices to a respective one of the curved mirrors over a plurality of angles corresponding to a field of view of an image;
wherein the processor is configured to selectively activate different individual ones of the scanning mirror array to accommodate different eye orientation data;
wherein the first curved mirror is configured to reflect the first plurality of collimated light beams from the first scanning mirror array into a first eye of the user in proximity to the first curved mirror; and
wherein the second curved mirror is configured to reflect the second plurality of collimated light beams from the second scanning mirror array into a second eye of the user in proximity to the second curved mirror.

15. The device of claim 14, wherein the plurality of light emitting elements in each of the light emitting devices comprises a plurality of vertical cavity surface-emitting lasers (VCSELs) and a respective plurality of dynamically adjustable focusing elements configured to adjust focus of the collimated light beams prior to the collimated light beams being directed to the curved mirror by the scanning mirror array.

16. The device of claim 14, wherein the plurality of light emitting elements comprises a plurality of vertical cavity surface-emitting laser (VCSEL) groups each comprising a red VCSEL, a blue VCSEL, and a green VCSEL.

17. The device of claim 14, wherein the curved mirrors are ellipsoid mirrors wherein the scanning mirror arrays are located at or near a first focus of the ellipsoid mirrors, and wherein the subject's eyes are located at or near a second focus of the ellipsoid mirrors.

18. The device of claim 14, wherein the curved mirrors each comprise a partially-reflective layer configured to transmit at least a portion of external light through the curved mirror to a respective one of the user's eyes, wherein the external light is incident on an opposite surface of the curved mirror relative to the collimated light beams incident on an internal surface of the curved mirror.

19. The device of claim 14, further comprising a gaze tracking module configured to:
monitor orientation of at least one of the user's eyes to determine eye orientation data; and provide the eye orientation data to the processor, wherein the processor is configured to dynamically select one or more active portions of the light emitting device array and the MEMS array based at least on the eye orientation data and a respective field of view corresponding to the one or more active portions of the light emitting device array and the MEMS array.

20. The device of claim 14, wherein:

the first and second light emitting devices each comprise a plurality of laser modules, each laser module comprising a red, a green, and a blue laser;

different ones of the laser modules are associated with respective fields of view; and the processor is configured to tilt one or more mirrors of the MEMS mirror array and selectively activate one or more of the laser modules to raster scan collimated light beams across a field of view corresponding to the selectively activated one or more laser modules to accommodate different eye swivel angles.

* * * * *